(12) United States Patent
Choi et al.

(10) Patent No.: US 8,896,161 B2
(45) Date of Patent: Nov. 25, 2014

(54) ELECTRONIC DEVICE USING SOLAR CELL

(75) Inventors: Jae Ho Choi, Seongnam-si (KR); Myoung-Chul Kim, Suwon-si (KR); Seung Hwan Moon, Asan-si (KR); Byoung Jun Lee, Asan-si (KR); Yun-Jae Kim, Seoul (KR); Kyung-Uk Choi, Gunpo-si (KR); Nam-Hee Goo, Asan-si (KR); Bo-Ram Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 553 days.

(21) Appl. No.: 13/241,433

(22) Filed: Sep. 23, 2011

(65) Prior Publication Data

US 2012/0256486 A1 Oct. 11, 2012

(30) Foreign Application Priority Data

Apr. 6, 2011 (KR) .................. 10-2011-0031754

(51) Int. Cl.
*H02J 7/00* (2006.01)

(52) U.S. Cl.
USPC ............................................. 307/150

(58) Field of Classification Search
USPC ............................................. 307/150
See application file for complete search history.

(56) References Cited

U.S. PATENT DOCUMENTS

| | | | |
|---|---|---|---|
| 8,004,113 B2 * | 8/2011 | Sander et al. | 307/46 |
| 2009/0298554 A1 | 12/2009 | Kim et al. | |
| 2010/0013309 A1 | 1/2010 | Rosenblatt et al. | |
| 2010/0167797 A1 | 7/2010 | Morichi | |
| 2010/0210322 A1 | 8/2010 | Kim et al. | |
| 2010/0237785 A1 * | 9/2010 | Lee | 315/150 |
| 2011/0109259 A1 * | 5/2011 | Choi et al. | 320/101 |
| 2012/0113554 A1 * | 5/2012 | Paoletti et al. | 361/63 |

FOREIGN PATENT DOCUMENTS

| | | |
|---|---|---|
| JP | 3159500 | 2/2001 |
| JP | 3472079 | 9/2003 |
| KR | 1019970034536 | 7/1997 |
| KR | 2019980063965 | 11/1998 |
| KR | 1020010086782 | 9/2001 |
| KR | 1020080025975 | 3/2008 |
| KR | 10201000032163 | 3/2010 |

* cited by examiner

*Primary Examiner* — Robert L. Deberadinis
(74) *Attorney, Agent, or Firm* — Cantor Colburn LLP

(57) ABSTRACT

An electronic device comprises a solar cell a main body which includes a display unit, a battery, and a processing unit and a power controller which connects the solar cell and the main body and controls the electronic device so that power generated from the solar cell is stored in the battery or used in the main body depending on a state of the main body.

16 Claims, 14 Drawing Sheets

Measure

Simulation

Measure

Simulation

ELECTRONIC DEVICE USING SOLAR CELL

This application claims priority to Korean Patent Application No. 10-2011-0031754, filed on Apr. 6, 2011, the content of which in its entirety is herein incorporated by reference.

BACKGROUND OF THE INVENTION (a) Field of the Invention

The general inventive concept relates to an electronic device using a solar cell, and more particularly, to an electronic device capable of controlling an output of the solar cell according to an operational state of the electronic device.

(b) Description of the Related Art

A solar cell converting photonic energy, e.g., solar energy, into electric energy has been recognized as renewable and non-polluting next-generation energy.

The solar cell typically includes a p-type semiconductor and an n-type semiconductor. In the solar cell, when photonic energy, e.g., sun light energy, is absorbed in an optical active layer, an electron-hole pair ("EHP") is generated in a semiconductor and electrons and holes generated due to the photonic energy move to the n-type semiconductor and the p-type semiconductor, respectively and are collected in electrodes so as to be used as the electric energy.

However, since it is substantially difficult to arbitrarily control the intensity of sun light which an output (voltage or current) of the solar cell depends on, it is substantially difficult to utilize the solar cell.

BRIEF SUMMARY OF THE INVENTION

The general inventive concept provides an electronic device having an advantage of actively utilizing an output of a solar cell according to an operational state of the electronic device.

An exemplary embodiment of the invention provides an electronic device including a solar cell, a main body which includes a display unit, a battery, and a processing unit, and a power controller which connects the solar cell and the main body and controls the electronic device so that power generated from the solar cell is stored in the battery or used in the main body depending on a state of the main body.

In one exemplary embodiment, the power controller may include an input terminal for the solar cell which receives an output of the solar cell, an output terminal for storage connected with an input terminal of the battery of the main body, an output terminal for consumption connected with a power terminal of the display unit or the processing unit of the main body, and an input terminal for the battery connected with an output terminal of the battery which supplies the power to the power terminal of the display unit or the processing unit of the main body.

In one exemplary embodiment, the power controller may transmit the output of the solar cell inputted to the input terminal for the solar cell to the battery through the output terminal for the storage, when the display unit or the processing unit of the main body does not operate.

In one exemplary embodiment, the power controller may transmit the output of the solar cell inputted to the input terminal for the solar cell to the display unit or the processing unit of the main body through the output terminal for consumption, when the display unit or the processing unit of the main body operates.

In one exemplary embodiment, the power controller may combine an output of the battery inputted from the input terminal for the battery and the output of the solar cell to output the combined output to the output terminal for consumption.

In one exemplary embodiment, the power controller may store a part of the output of the solar cell inputted to the input terminal of the solar cell in the battery through the output terminal of the storage.

In one exemplary embodiment, the power controller may further include a switching unit which is connected between the input terminal for the solar cell and the output terminal for the storage and operates depending on an input value of the input terminal for the battery, and a power output unit which is connected with the input terminal for the solar cell and the input terminal for the battery to receive the output of the solar cell and the output of the battery and combines the output of the solar cell and the output of the battery to transmit the combined output to the output terminal for consumption.

In one exemplary embodiment, the power output unit may include an input diode for the solar cell connected in a forward direction from the input terminal for the solar cell, and an input diode for the battery connected in a forward direction from the input terminal for the battery.

In one exemplary embodiment, the switching unit may include a switching unit transistor, and an input terminal of the switching unit transistor may be connected to the input terminal for the solar cell, an output terminal of the switching unit transistor may be connected to the output terminal for the storage, and a control terminal may be connected with the input terminal for the battery.

In one exemplary embodiment, the power controller may further include a diode which prevents power leak of the battery connected between the output terminal of the switching unit transistor and the output terminal for the storage in a forward direction from the output terminal of the switching unit transistor.

In one exemplary embodiment, the power controller may further include a switch controller formed between the input terminal for the battery and the control terminal of the switching unit transistor, the switch controller may include a switch controller transistor, and an input terminal of the switch controller transistor may be connected with the control terminal of the switching unit transistor, an output terminal may be connected with a ground, and a control terminal may be connected with the input terminal for the battery.

In one exemplary embodiment, a first resistor may be formed between the output terminal of the switch controller transistor and ground, a first node may be disposed between the control terminal of the switch controller transistor and the input terminal for the battery, the first node may be connected with the ground through a second resistor, and the second resistor may have a resistance higher than that of the first resistor.

In one exemplary embodiment, the first node may be also connected with the power output unit and an input diode for the battery formed in a forward direction from the first node may be included in the power output unit.

In one exemplary embodiment, the switching unit transistor and the switch controller transistor may be PNP type transistors.

In one exemplary embodiment, the electronic device may further include an input terminal capacitor connected between the input terminal for the solar cell and the ground.

In one exemplary embodiment, the processing unit may include an input device.

According to exemplary embodiments of the disclosure, an electronic device can actively control an output of a solar cell to be stored in a battery or consumed in accordance with an operational state thereof.

As a result, the output of the solar cell can be efficiently used and in the case of a portable electronic device, the electronic device can be used at the same time as a battery is charged through the solar cell.

Further, since a power controller for controlling the solar cell can also be formed by several analog elements, a manufacturing cost is not significantly increased.

BRIEF DESCRIPTION OF THE DRAWINGS

The above and other advantages and features of this disclosure will become more apparent by describing in further detail embodiments thereof with reference to the accompanying drawings, in which.

DETAILED DESCRIPTION OF THE INVENTION

Figure 1:
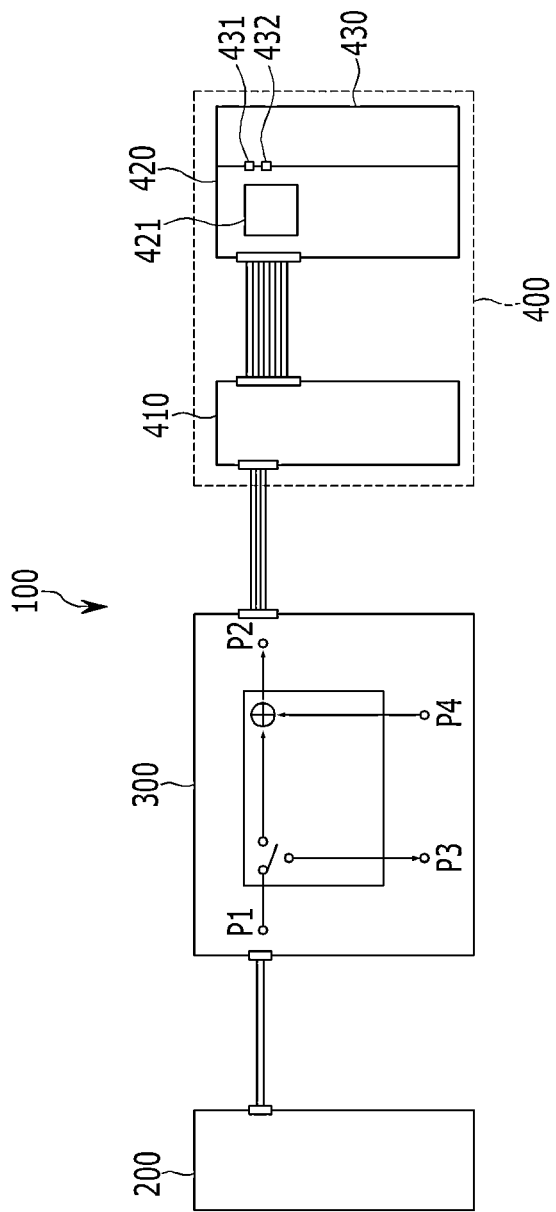
FIG. 1 is a block diagram of an exemplary embodiment of an electronic device using a solar cell.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Exemplary embodiments of the invention provide actively controlling an output of a solar cell 200 according to an operational state of an electronic device 100, According to the exemplary embodiments, the output of the solar cell 200 is stored in a battery 430 while the electronic device 100 is not used, and the output of the solar cell 200 is controlled to be substantially immediately used for the electronic device 100 while the electronic device 100 is used.

In one exemplary embodiment, when the electronic device 100 uses lower power (voltage or current) than the output of the solar cell 200, remaining power may be stored in a battery 430.

Exemplary embodiments of the disclosure may be applied to various types of electronic devices, but it may be substantially effective to be applied to a portable electronic device.

The portable electronic devices may include a mobile phone, a smart phone, a laptop computer, a netbook, a tablet personal computer ("PC"), a portable multimedia player ("PMP"), an MPEG-1 Audio Layer 3 ("MP3") player, a compact disk ("CD") player, a portable game device, a navigation device, for example, but are not limited thereto.

Furthermore, typically, a display unit is a part which consumes a relatively large amount of power compared other parts in the portable electronic device is a display unit. The display unit may include a liquid crystal display ("LCD") unit, an electrophoretic display unit, an organic light emitting display ("OLED") unit, for example, but is not limited thereto.

Hereinafter, an exemplary embodiment of a laptop computer which consumes a relatively large amount of power among portable electronic devices will be described. The exemplary embodiment of the laptop computer may use a liquid crystal display unit as a display unit. However, the general inventive concept is not limited thereto, and other various types of an electronic device including other various types of a display unit may be used.

Hereinafter, an exemplary embodiment of an electronic device and an operational order thereof will be described with reference to FIGS. 1 to 4.

Figure 2:
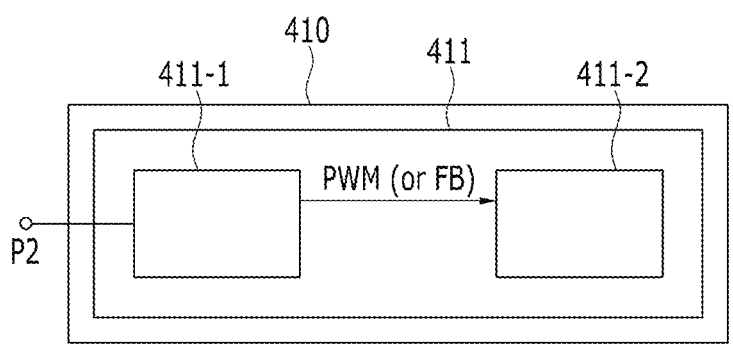
FIG. 2 is a detailed block diagram of an exemplary embodiment of a display device.
Figure 3:
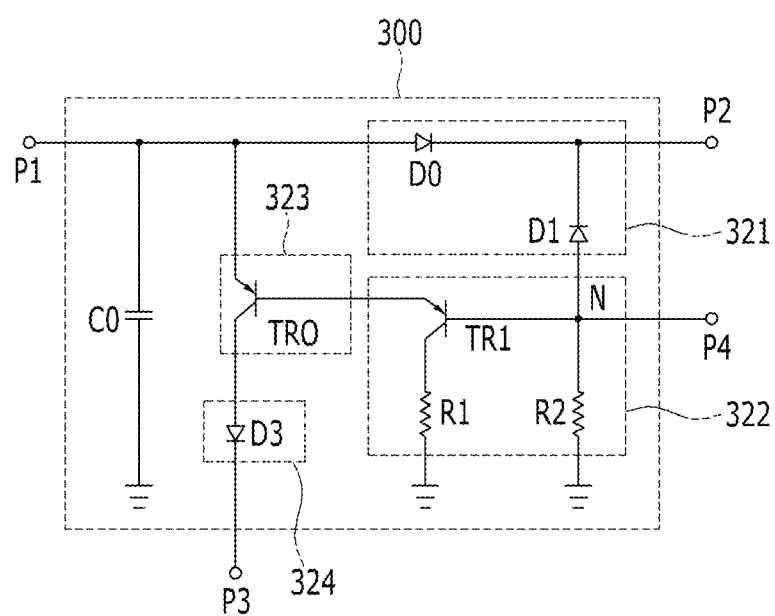
FIG. 3 is a circuit diagram of an exemplary embodiment of a power controller.
Figure 4:
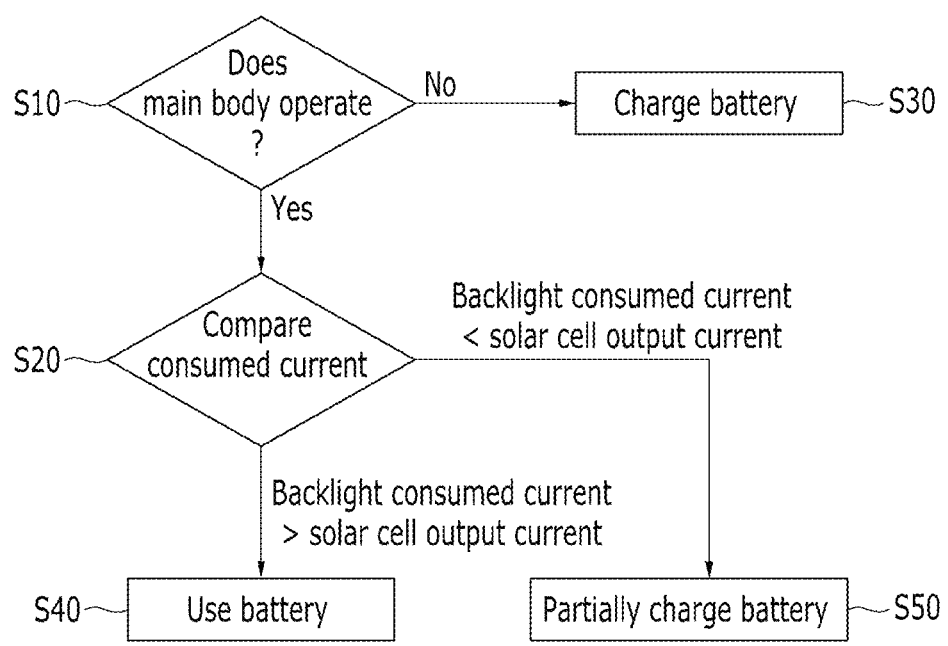
FIG. 4 is an operational flowchart of an exemplary embodiment of a power controller.

FIG. 1 is a block diagram of an exemplary embodiment of an electronic device using a solar cell, FIG. 2 is a detailed block diagram of an exemplary embodiment of a display device, FIG. 3 is a circuit diagram of an exemplary embodiment of a power controller, and FIG. 4 is an operational flowchart of an exemplary embodiment of a power controller.

First, referring to FIG. 1, a connection relation of an exemplary embodiment of the electronic device 100 is shown by a block diagram.

The exemplary embodiment of the electronic device 100 (e.g., laptop computer) includes a solar cell 200, a power controller 300, and a main body 400.

First, the main body 400 includes a display unit 410, a processing unit 420, and a battery 430 and the processing unit 420 includes an input device 421. The display unit 410 and the processing unit 420 of the main body 400 are connected to each other through a cable. In the exemplary embodiment, the display unit 410 receives an output of the power controller 300 to transfer the output to the processing unit 420. Furthermore, in the exemplary embodiment, an output terminal 431 and an input terminal 432 of the exemplary embodiment of the battery 430 are connected to the power controller 300 via the processing unit 420 and the display unit 410. The display unit 410 and the processing unit 420 receive the power from the power controller 300 through power terminals which are formed in the display unit 410 and the processing unit 420, respectively. In the exemplary embodiment, the input device 421 includes various types of electronic devices such as a laptop computer, a cellular phone, a keyboard, a mouse, or a touch screen, for example, but is not limited thereto.

FIG. 2 is a block diagram schematically showing a backlight unit 411 used in a case where the display unit 410 of the main body 400 is a light-receiving type display unit such as the LCD unit, for example, and the backlight unit 411 includes a controller 411-1 and a light source 411-2. The controller 411-1 receives the power from a P2 terminal of the power controller 300, and then, transfers the power to the light source 411-2. In addition, luminance of the light source 411-2 is controlled by controlling a pulse width modulation PWM (or feedback FB) signal from the controller 411-1. Herein, the luminance control of the light source 411-2 may be controlled on a basis of a duty ratio of the PWM (or FB) signal.

In the exemplary embodiment, the solar cell 200 is connected to a P1 input terminal of the power controller 300. The solar cell 200 may be electrically connected with the power controller 300 through two individual terminals of the P1 input terminal, i.e., a positive (+) terminal and a negative (−) terminal. An output (e.g., power voltage or current) of the solar cell 200 may be transferred through the positive (+) terminal, and the negative (−) terminal may be connected to the power controller 300 through a ground terminal of the power controller 300.

The power controller 300 has two input terminals P1 and P4 and two output terminals P2 and P3.

The P1 input terminal is connected with the solar cell 200 and may be also referred to as an input terminal for the solar cell.

The P2 output terminal is an output terminal connected with the main body 400 to output the power so that the display unit 410 including the backlight unit 411 or the processing unit 420 including the input device 421 of the main body 400 can use the power. The P2 output terminal may be also referred to as an output terminal for consumption. The P2 output terminal is connected with the power terminal of the display unit 410 or the processing unit 420 in the main body 400 through a connector connecting the main body 400 and the power controller 300 to supply the power. Referring to FIG. 2, the connection of the backlight unit 411 of the display unit 410 and the P2 output terminal is shown.

In an electronic device, typically, the power is directly supplied to the display unit 410 or the processing unit 420 from the battery 430 in the main body 400, but in the exemplary embodiment of electronic device 100, the output of the battery 430 is transferred to the display unit 410 or the processing unit 420 via the power controller 300.

In one exemplary embodiment, the P4 input terminal is connected with the output terminal 431 of the battery 430 and may be also referred to as an input terminal for a battery. In the above described exemplary embodiment, the output terminal 431 of the battery 430 is electrically connected to the P4 input terminal via the connector connecting the main body 400 and the power controller 300.

In the exemplary embodiment, the P3 output terminal is connected with the input terminal 432 of the battery 430, transfers the power of the solar cell 200 to the battery 430. The P3 output terminal may be also referred to as an output terminal for storage. The P3 output terminal is electrically connected with the input terminal 432 of the battery 430 via the connector connecting the main body 400 and the power controller 300.

The power controller 300 transmits the output of the solar cell 200 inputted into the P1 input terminal to the P3 output terminal to be stored in the battery 430 or transmits the output to the P2 output terminal to be consumed in the display unit 410 or the processing unit 420 of the main body 400. An operation of a switch in the power controller 300 determines whether the power controller 300 transmits the output of the solar cell 200 to the P3 output terminal or the P2 output terminal. The operation of the switch of the power controller 300 will be described below in detail referring to FIG. 3.

Furthermore, the output of the battery 430 inputted to the P4 input terminal is also transmitted to the P2 output terminal to be consumed in the display unit 410 or the processing unit 420 of the main body 400. Therefore, a sum of the inputs of the P1 input terminal and the P4 input terminal is transmitted to the P2 output terminal, the main body 400 operates based on the output of the battery 430 from the P4 input terminal in a case of a small output of the solar cell 200, and the main body 400 operates with only the output of the solar cell 200 from the P1 input terminal in a case of a sufficient output of the solar cell 200. In one exemplary embodiment, when the output of the solar cell 200 remains after operating the main body 400, the remaining output may be also stored in the battery 430 through the P3 output terminal. That is, while the power consumption required in the main body 400 is applied through the P2 output terminal, the power inputted from the battery 430 becomes substantially smaller when the output of the solar cell 200 supplied to the P2 becomes substantially larger, thereby the power consumption of the battery 430 substantially decreases.

As described above, the operation of the power controller 300 is schematically shown as a flowchart in FIG. 4.

The power controller 300 determines whether or not the main body 400 operates (S10).

When the main body 400 does not operate, the power controller 300 transmits the power inputted through the P1 input terminal to the battery 430 through the P3 output terminal, thereby charging the battery 430 (S30).

In the exemplary embodiment, when the main body 400 operates, the power controller 300 compares current consumed to the P2 output terminal (i.e., backlight consumption current in FIG. 4) with current inputted to the P1 output terminal (i.e., solar cell output current in FIG. 4) (S20).

As a result, when the backlight consumption current is larger than the solar cell output current, a whole current inputted from the solar cell 200 is used and a further required current is supplied from the battery 430 (S40), and when the backlight consumption current is smaller than the solar cell output current, a remaining current of a current inputted from the solar cell 200 is used to charge the battery 430 (S50).

FIG. 3 shows an exemplary embodiment of the power controller 300 but the power controller 300 operating as described above may be manufactured in various structures. In one exemplary embodiment, the power controller 300 as shown in FIG. 3 may include only a few analog elements, thereby reducing manufacturing costs.

An exemplary embodiment of a detailed circuit structure of the power controller 300 will be described with reference to FIG. 3.

The exemplary embodiment of the power controller 300 includes a switching unit 323, a power output unit 321, and a switch controller 322.

The power output unit 321 combines the output of the solar cell 200 inputted from the P1 input terminal and the output of the battery 430 from the P4 input terminal to transmit the combined output to the main body 400. The power output unit 321 includes a D0 diode (also referred to as an input diode for a solar cell) connected from the P1 input terminal to the P2 output terminal (forward direction) and a D1 diode (also referred to as an input diode for a battery) connected from the P4 input terminal to P2 output terminal (forward direction) and has a structure in which outputs of the D0 diode and the D1 diode are combined to be transmitted to the P2 output terminal.

In the exemplary embodiment, the switching unit 323 includes a switching unit transistor TR0 and the exemplary embodiment of the switching unit transistor TR0 includes a PNP type transistor. An input terminal of the switching unit transistor TR0 is connected to the P1 input terminal, an output terminal is connected to the P3 output terminal, and a control terminal is connected with the P4 input terminal through the switch controller 322. That is, the switching unit 323 operates the switching unit transistor TR0 according to a signal of the switch controller 322 that operates depending on a signal of the P4 input terminal. When the switching unit transistor TR0 is in an on state, the power of the solar cell 200 inputted to the P1 input terminal is outputted to the P3 output terminal to be stored in the battery 430. In the exemplary embodiment, referring to FIG. 3, a D3 diode 324 for preventing the battery power from being leaked is additionally formed between the output terminal of the switching unit transistor TR0 and the P3 output terminal. The D3 diode is connected toward the P3 output terminal from the switching unit 323 in a forward direction to transmit the output of the solar cell 200 to the battery 430 and acts to prevent the power from overflowing to the switching unit 323 from the battery 430 in a reverse direction.

The switch controller 322 controlling the switching unit 323 includes a switch controller transistor TR1. In the exemplary embodiment, the switch controller transistor TR1 includes a PNP type transistor. An input terminal of the switch controller transistor TR1 is connected with the control terminal of the switching unit transistor TR0 of the switching unit 323, an output terminal is grounded through an R1 resistor, and a control terminal is connected to the P4 input terminal, an R2 resistor, and an anode of the D1 diode of the power output unit 321 through an N node.

The R2 resistor has a resistance significantly larger than that of the R1 resistor and the R1 resistor may be formed with an actual element, such as resistor made of various compounds and films, but is not limited thereto, and may mean a resistance of a wire.

The N node transmits the power of the battery 430 transmitted from the P4 input terminal to the D1 diode of the power output unit 321. When the P4 input terminal is floated as the main body 400 stops operating, the switch controller transistor TR1 is turned on. When the power of the battery 430 is transmitted to the D1 diode of the power output unit 321, the R2 resistor may have a large resistance sufficient not to leak into the ground terminal.

In the exemplary embodiment, an input terminal capacitor C0 which is connected with the ground in series is connected parallel to the P1 input terminal and acts to stabilize the output from the solar cell 200. In addition, in one exemplary embodiment, an on/off operation characteristic of the switching unit transistor TR0 may be changed by adjusting a size of the input terminal capacitor C0 to be controlled such that a part of the power supplied from the solar cell 200 is stored into the battery 430 or the entire power is used in the main body 400. The above described exemplary embodiment will be further described in FIGS. 8 and 9.

An exemplary embodiment of an operation of the power controller 300 having the structure described above will be described below.

First, when the main body 400 does not operate, the P4 input terminal is floated. As a result, a current flows in the control terminal of the switch controller transistor TR1 by the R2 resistor, such that the switch controller transistor TR1 is turned on. When the switch controller transistor TR1 is turned on, a current flows in the control terminal of the switch controller transistor TR0 by the R1 resistor, such that the switching unit transistor TR0 is also turned on. As a result, the output inputted through the P1 input terminal from the solar cell 200 passes through the D3 diode and the P3 output terminal via the switching unit 323 to be transmitted and charged in the input terminal 432 of the battery 430 (Charging mode). In this case, the output of the solar cell 200 inputted through the P1 input terminal may be transmitted to the D0 diode of the power output unit 321, but since the main body 400 does not operate and a load at the P2 output terminal is very large, the output transmitted to the power output unit 321 is substantially insignificant.

In the exemplary embodiment, when the main body 400 operates, output voltage of the battery 430 is applied to the P4 input terminal. The exemplary embodiments of the output voltage of the battery 430 may have a value of about 9 to about 13V, such that the switch controller transistor TR1 is turned off and accordingly, the switching unit transistor TR0 is also turned off. As a result, the output of the solar cell 200 is not transmitted to the P3 output terminal and the output of the solar cell 200 is consumed in the display unit 410 or the processing unit 420 of the main body 400 through the P2 output terminal (Reduction mode).

In the exemplary embodiment, in the exemplary embodiment, the output of the solar cell 200 may be charged in the battery and partially consumed in the main body 400 (Charging and Reduction mode).

The Charging and Reduction mode, as the case where all the output of the solar cell 200 is transmitted to the P2 output terminal and the P3 output terminal, may be controlled by various methods and hereinafter, an exemplary embodiment of the backlight unit 411 using a feedback (FB) signal or a pulse width modulation signal PWM will be described.

The backlight unit 411 includes the light source 411-2 and the controller 411-1 as shown in FIG. 2, receives the feedback (FB) signal in order to adjust brightness of the light source 411-2 to control a duty ratio of the PWM signal and be applied to the light source 411-2, such that luminance of the backlight unit 411 is controlled. That is, the PWM signal includes a high period and a low period and in the high period, the light source 411-2 keeps the state of on and in the low period, the light source 411-2 is turned off. In the above described exemplary embodiment, the feedback (FB) signal has high/low periods opposite to the PWM signal. Accordingly, in a period when the light source 411-2 is lighted on, the power controller 300 transmits the output of the solar cell 200 to the backlight unit 411 through the P2 output terminal to light-on the light source 411-2, and in a period when the light source 411-2 is lighted off, the power controller 300 can store the output of the solar cell 200 in the battery 430 through the P3 output terminal.

A change of the voltages of the input terminal and the control terminal of the switching unit transistor TR0 depending on the PWM signal (or the feedback FB signal) will be described with reference to FIGS. 5 to 7.

Figure 5:
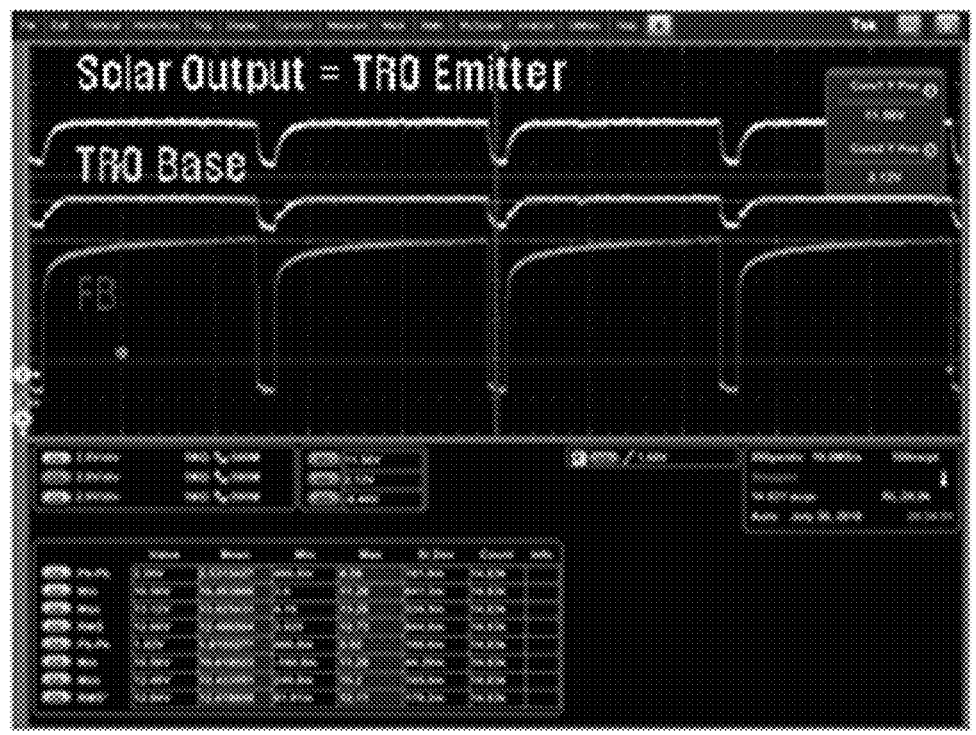
FIGS. 5 to 7 are graphs measuring and simulating voltage of an exemplary embodiment of a switching unit transistor of a power controller according to brightness of a display device.
Figure 5:
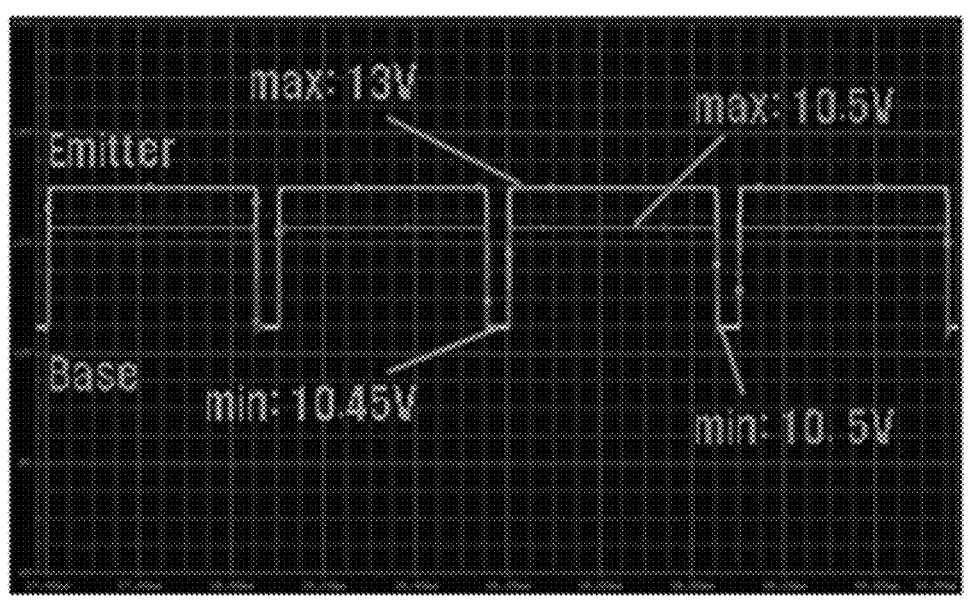
Figure 6:
Figure 6:
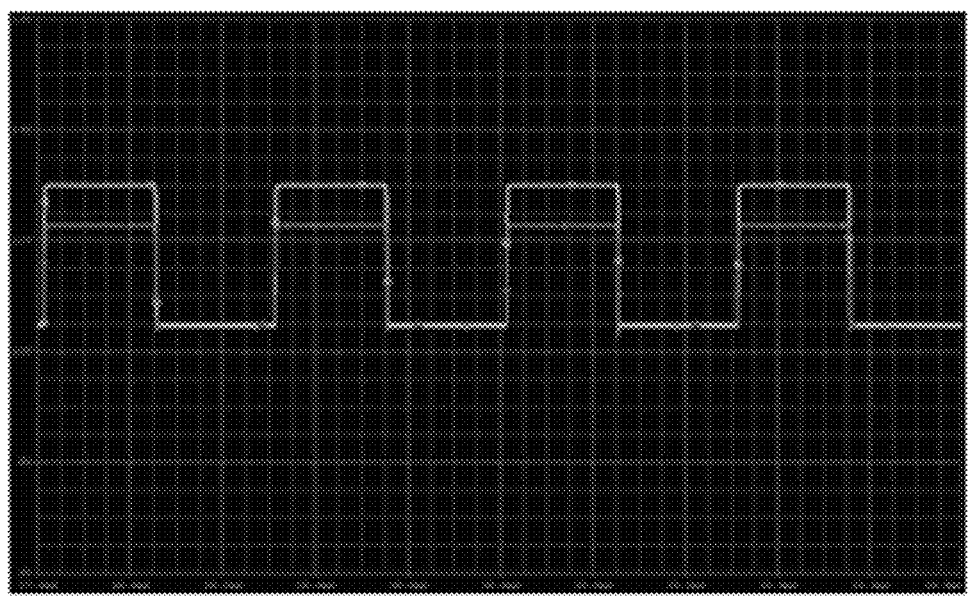
Figure 7:
Figure 7:

FIGS. 5 to 7 are graphs measuring and simulating exemplary embodiments of voltages of a switching unit transistor of a power controller according to brightness of a display device.

First, FIG. 5 shows an exemplary embodiment in which the high period of the feedback (FB) signal is substantially long and the low period of the feedback (FB) signal is substantially short, and a result, an off state is long, and FIGS. 6 and 7 show exemplary embodiments in which an on state is extended as time elapsed, and as a result, the backlight unit 411 maintains the on state during most of the time in FIG. 7.

In addition, FIGS. 5, 6, and 7 each includes two graphs, an upper graph (measure) is a graph actually measuring voltages in the input terminal (emitter) and the control terminal (base) of the switching unit transistor TR0, and a lower graph (simulation) is a result graph simulating voltages in the input terminal (emitter) and the control terminal (base) of the switching unit transistor TR0. However, FIGS. 5, 6, and 7 show a result of measurement and simulation while the C0 capacitor which is the input terminal capacitor is removed in order to verify voltage variation in the input terminal of the switching unit transistor TR0.

As shown in FIGS. 5 to 7, the voltages of the feedback (FB) signal and the input terminal and the control terminal of the switching unit transistor TR0 have the substantially same characteristic in a phase change.

The light source 411-2 of the backlight unit 411 is lighted off in the high period of the feedback (FB) signal (the low period of the PWM signal) and loads of the power controller 300 and the main body 400 are significantly large when seen from the solar cell 200.

Figure 12:
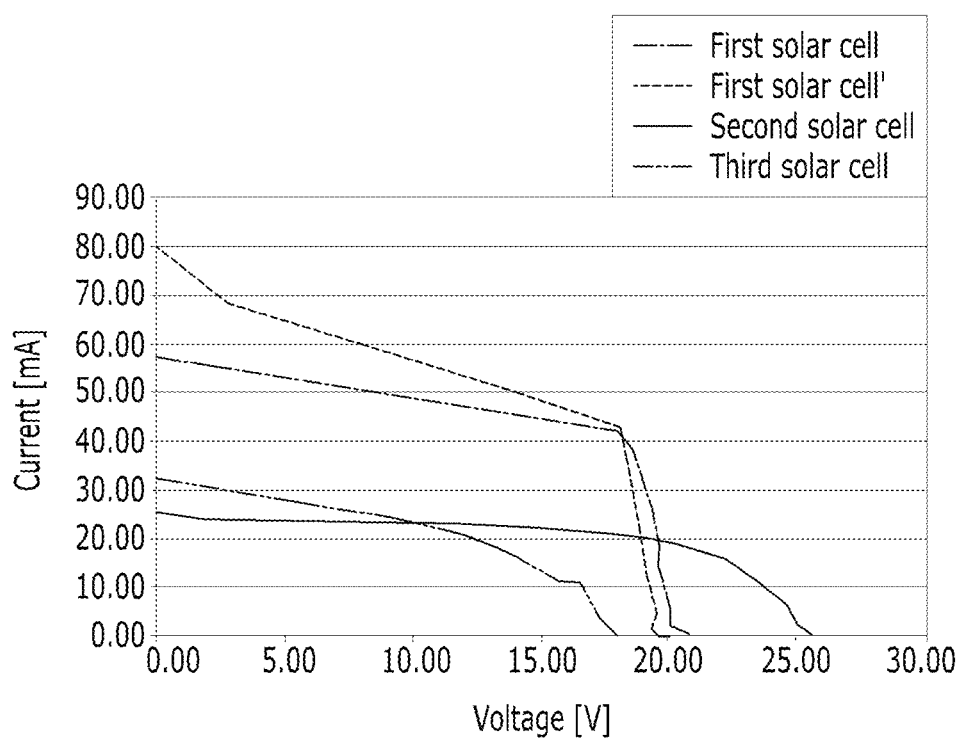
FIG. 12 is a graph showing voltage and current characteristics depending on a type of a solar cell.

A characteristic of the solar cell 200 is shown in FIG. 12. When the load of the solar cell 200 is increased (the load is gradually increased toward a rightward direction in FIG. 12), the current is decreased, but the voltage value is increased. As a result, the voltages of the input terminal and the control terminal of the switching unit transistor TR0 connected with the P1 input terminal are also increased.

As a result, a difference between the voltages of the input terminal and the control terminal of the switching unit transistor TR0 is generated in the high period of the feedback (FB) signal (the lighted-off period of the backlight unit) as shown in the lower simulation diagrams of FIGS. 5 to 7, such that the switching unit transistor TR0 is turned on and the output of the solar cell 200 is charged in the battery 430.

In the exemplary embodiment, the voltages of the input terminal and the control terminal of the switching unit transistor TR0 are the same in the low period of the feedback (FB) signal (the lighted-on period of the backlight unit) as shown in the lower simulation diagrams of FIGS. 5 to 7, such that the switching unit transistor TR0 is turned off and the output of the solar cell 200 is not transmitted to the battery 430.

Even though FIGS. 5 to 7 show the feedback (FB) signal, but even the PWM signal in which the high period and the low period are reversed may acquire the same result.

Furthermore, since the feedback (FB) signal in FIGS. 5 to 7 is repeated in the high and low periods for a substantially short time, in considering an operation for a predetermined time, the power controller 300 alternately generates the battery charge (Charging mode) and the power consumption of the main body 400 (Reduction mode) for the predetermined time, Therefore, the above described exemplary embodiment may be referred to as the Charging and Reduction mode.

However, in the case where the Charging and Reduction mode is operated, since a charged time in the battery is very short, the battery is not substantially charged and charging efficiency may be substantially deteriorated. Accordingly, in the case where the main body 400 operates, the output of the solar cell 200 is set to be used in the main body 400 as much as possible and in the case where the main body 400 does not operate, the output is set to be charged in the battery 430, such that the efficiency may be substantially improved.

Hereinafter, a graph measuring the voltages of the input terminal and the control terminal of the switching unit transistor TR0 after adding the input terminal capacitor C0 will be described with reference to FIGS. 8 and 9.

Figure 8:
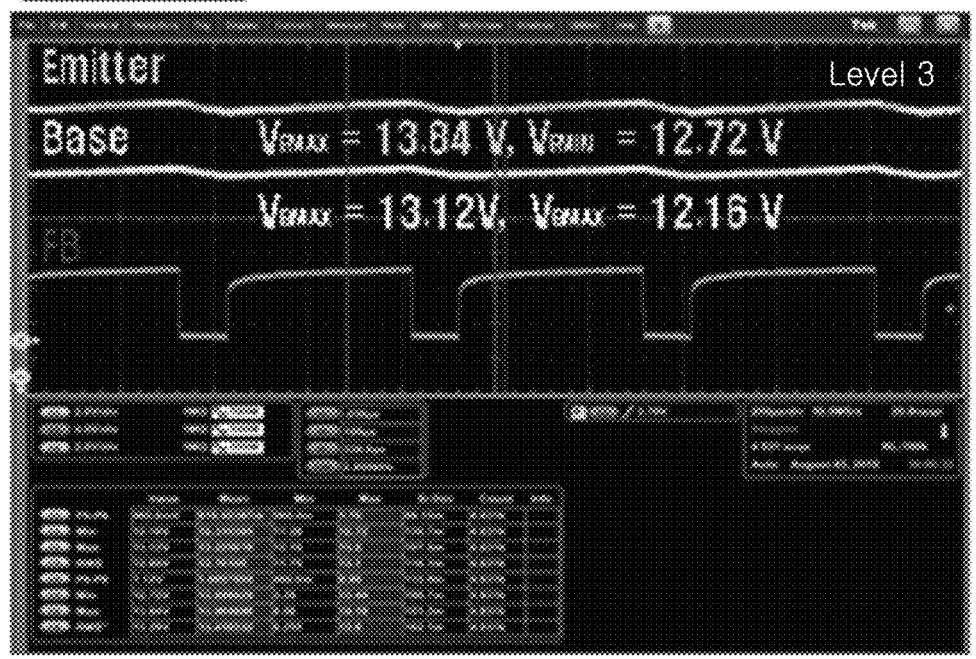
FIGS. 8 and 9 are graphs measuring and simulating voltage with an input terminal capacitor of a power controller added according to an exemplary embodiment of the invention.
Figure 8:
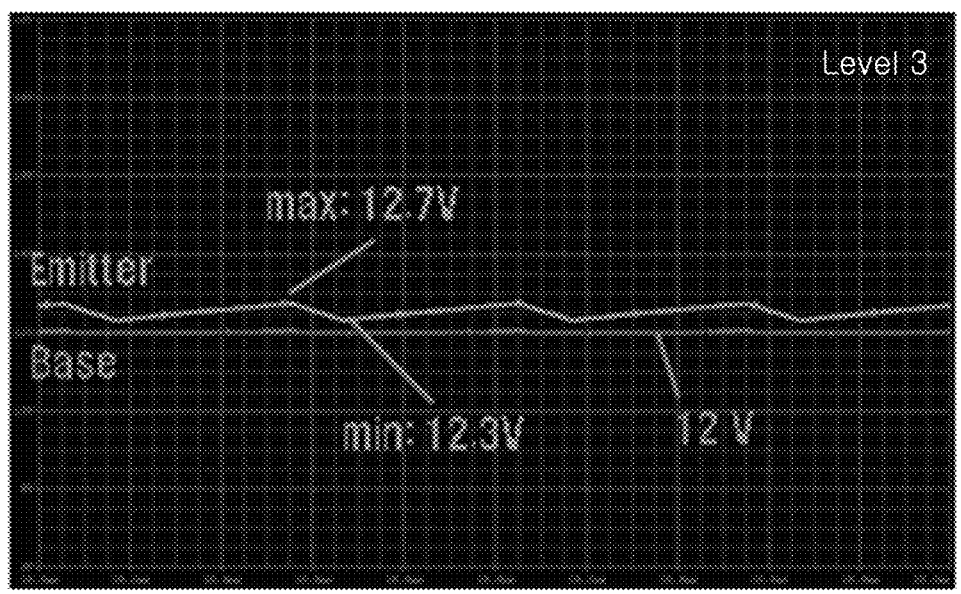
Figure 9:
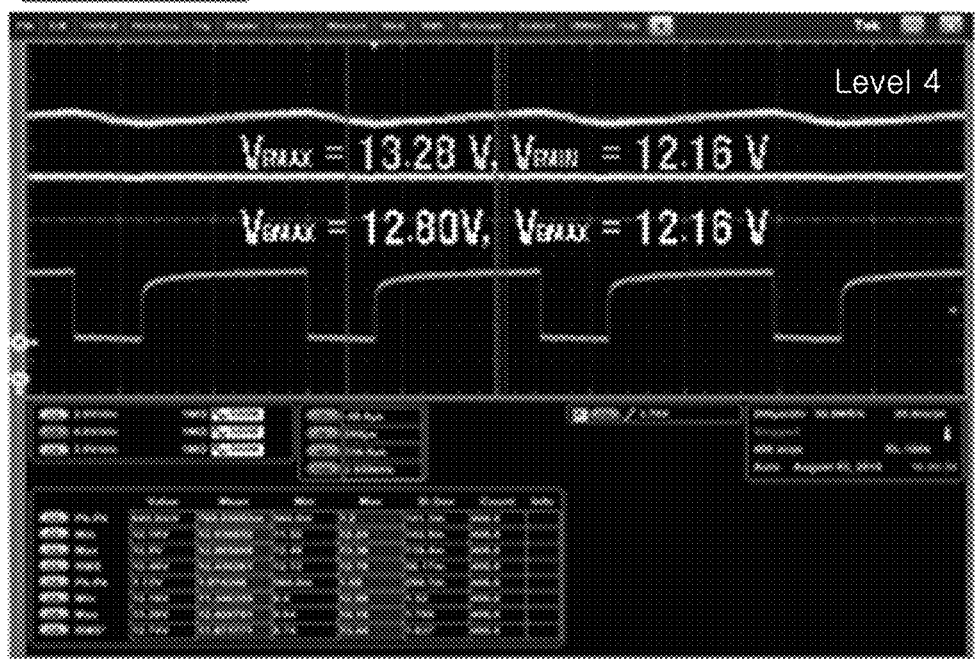
Figure 9:
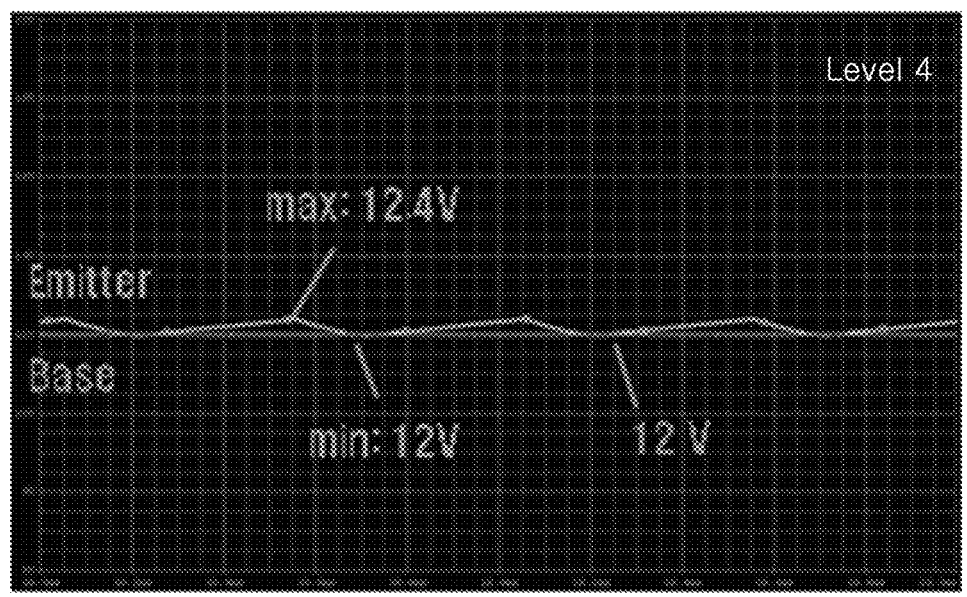

FIGS. 8 and 9 are graphs measuring and simulating an exemplary embodiment of voltage with an added input terminal capacitor of a power controller.

As shown in FIGS. 8 and 9, a variation range of the output voltage of the solar cell 200 inputted through the P1 input terminal is substantially decreased due to the input terminal capacitor C0.

In the case of the feedback (FB) signal shown in FIGS. 8 and 9, there is no large difference in variation range in the lighted-on period of the backlight unit 411, and corresponding voltage variations in the input terminal and the control terminal of the switching unit transistor TR0 are shown.

In FIGS. 8 and 9, level 3 and level 4 are described respectively. The levels are acquired by dividing the brightness of the backlight unit 411 into numerical values of 1 to 10 where a higher numerical value represents higher luminance.

In FIG. 8, in the case of the input terminal and the control terminal of the switching unit transistor TR0, according to a lower simulated graph, a difference in voltage between the input terminal and the control terminal is a maximum difference of about 0.7 V and the minimum difference of about 0.3 V. Since the switching unit transistor TR0 used in the exemplary embodiment is turned on when the difference in voltage between the input terminal and the control terminal thereof is about 0.7 V, the switching unit transistor TR0 maintains the turn-on state for a predetermined time even in the minimum voltage difference, but an output through the output terminal is not substantially large. Therefore, in the case of the maximum voltage difference, the switching unit transistor TR0 is completely turned on to charge the battery 430, and in the case of the minimum voltage difference, the power is partially consumed by the backlight unit 411 and the remaining power may be charged in the battery 430, but the power charged in the battery 430 is not substantially large.

In the exemplary embodiment, referring to FIG. 9, the voltage difference between the input terminal and the control terminal of the switching unit transistor TR0 substantially decreases. According to a lower graph of FIG. 9, the input terminal and the control terminal of the switching unit transistor TR0 have a maximum voltage difference of about 0.4 V and a minimum voltage difference of about 0 V. Since the voltage difference of 0.4 V is a level which slightly turn on the switching unit transistor TR0, it may be seen that the switching unit transistor TR0 substantially maintains a turn-off state. As a result, the whole output of the solar cell 200 is consumed in the main body 400.

Although a difference in display luminance of the backlight unit 411 is not substantially large in FIGS. 8 and 9, FIGS. 8 and 9 show that voltage values of the input terminal and the control terminal of the switching unit transistor TR0 vary. Therefore, the power controller 300 can operate actively according to the difference in display luminance of the backlight unit 411.

Furthermore, the variations of the voltage values of the input terminal and the control terminal of the switching unit transistor TR0 can be changed by controlling a size of the input terminal capacitor C0, such that battery charging (a charging mode) or using the output of the solar cell in the main body (a reduction mode) may be selectively performed by changing a characteristic of each element of the power controller 300.

Figure 10A:
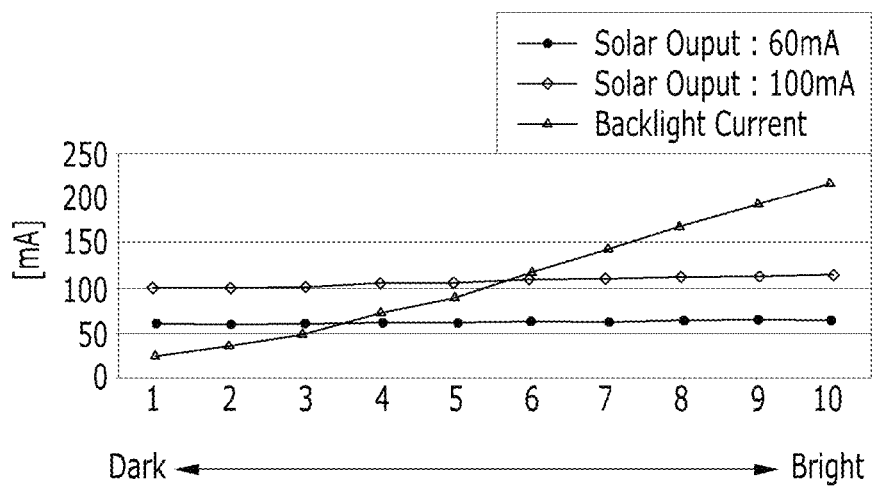
FIGS. 10A to 10C are graphs illustrating an exemplary embodiment of an operation of an electronic device depending on the type of a solar cell.
Figure 10B:
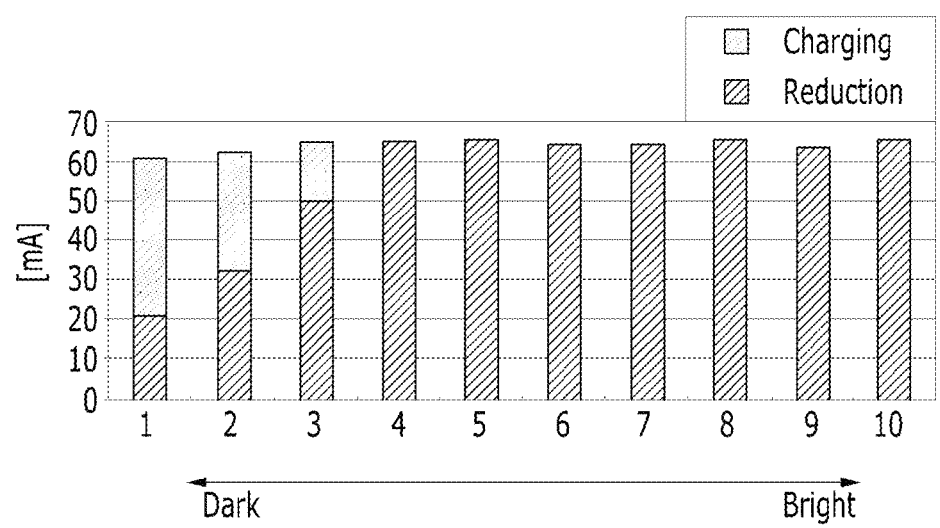
Figure 10C:
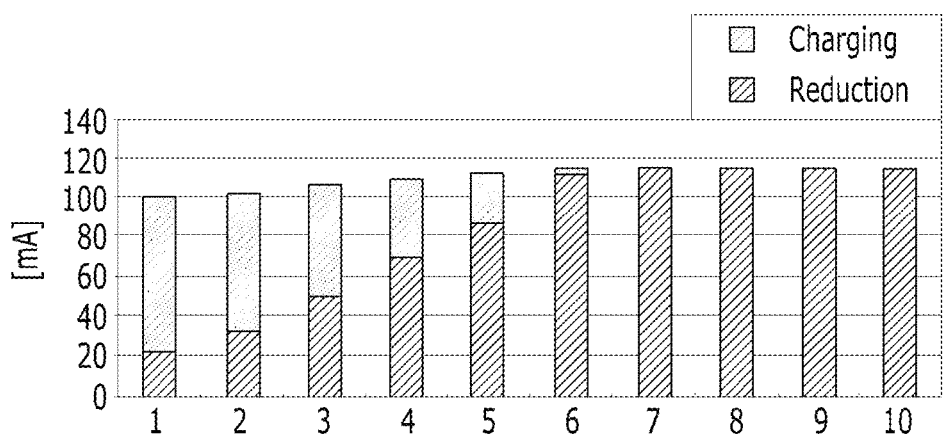
Figure 11:
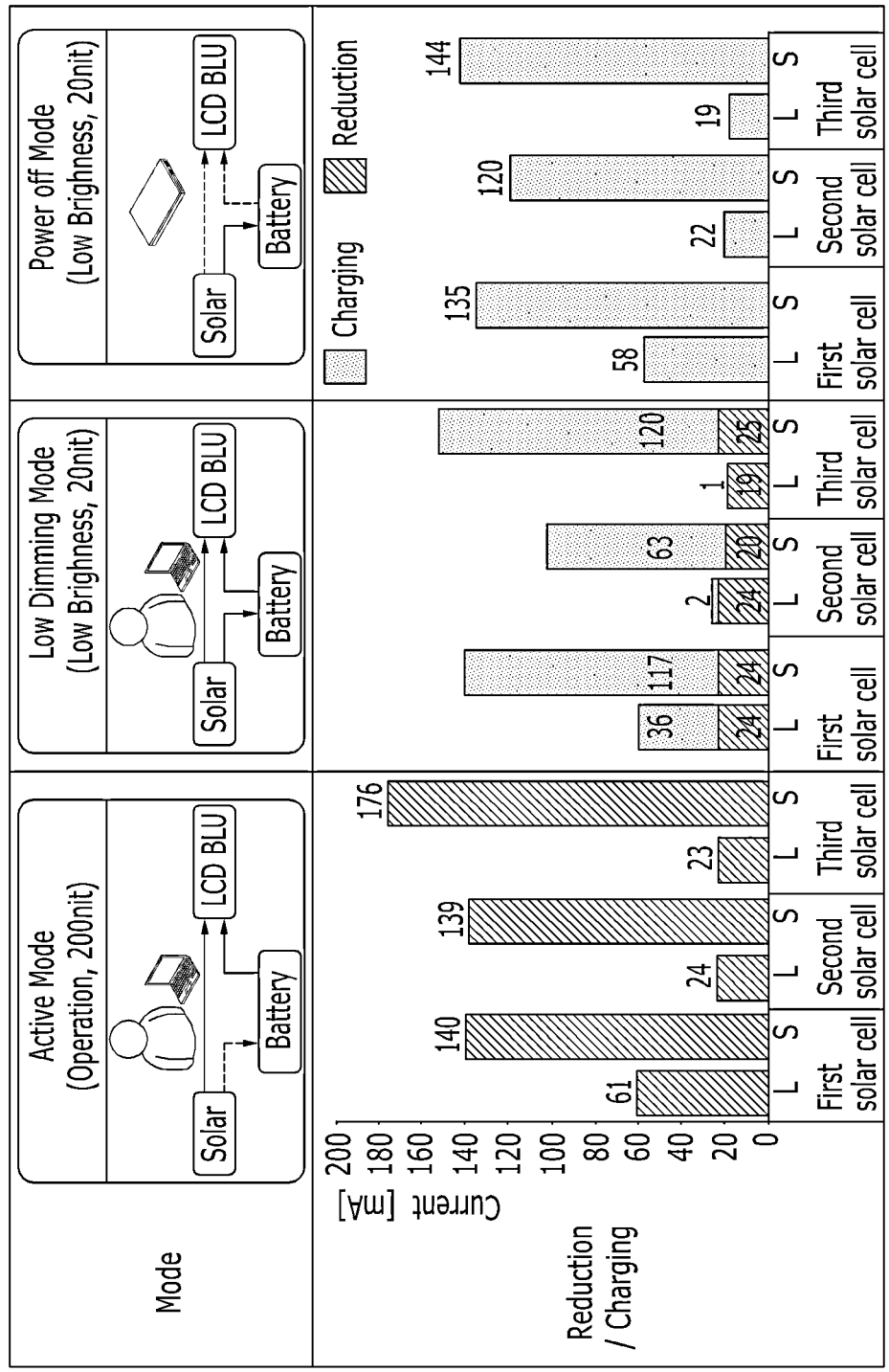
FIG. 11 is a diagram showing an exemplary embodiment of an operation of an electronic device depending on use modes for various solar cells.

In FIGS. 10 and 11, the case of charging the output in the battery and the case of using the output in the main body are shown through graphs for easier viewing.

First, an exemplary embodiment shown in FIG. 10 will be described.

FIGS. 10A to 10C are graphs illustrating an exemplary embodiment of an operation of an electronic depending on a type of a solar cell. In FIGS. 10A to 10C, figures on a horizontal axis are arbitrarily divided on the basis of the brightness of the backlight unit 411. A higher numerical value on the horizontal axis represents higher luminance.

FIG. 10A shows that a consumed current substantially increases as the luminance of the backlight unit 411 substantially increases when outputs of two solar cells are 60 mA and 100 mA, respectively.

As a result, according to FIG. 10B, the solar cell generating the output current of 60 mA charges the battery 430 in brightness levels 1 to 3, but in higher brightness levels (i.e., levels 4 to 10), a whole output current of the solar cell is consumed in the backlight unit 411 and the battery supplies a current for an insufficient amount.

In the exemplary embodiment, referring to FIG. 10C, the solar cell generating the output current of 100 mA is shown and since the output current is larger than that of FIG. 10B, the battery is charged together under up to the brightness of level 6.

Hereinafter, FIG. 11 will be described.

FIG. 11 is a diagram showing an exemplary embodiment of an operation of an electronic device depending on use modes for various solar cells.

First, referring to FIG. 11, three types of solar cells are used in a test. A first solar cell is the solar cell using a polycrystalline semiconductor, and a second solar cell and a third solar cell are solar cells using an amorphous semiconductor. Since solar cells are manufactured by different manufacturers, solar cells show different characteristics.

Furthermore, referring to FIG. 11, the test is performed for each of a case in which sun light is irradiated to each solar cell (indicated by 'S') and a case in which a halogen lamp is irradiated to each solar cell (indicated by 'L').

Referring to FIG. 11, in an active mode as a case of using the solar cells while sufficiently showing a performance of the electronic device, the test is performed on a bais of a case in which a backlight unit, e.g., LCD backlight unit ("BLU"), generates luminance of about 200 nits. In a low dimming mode as a case of using the solar cells by minimizing the performance of the electronic device, the test is performed on a basis of a case in which the backlight unit generates luminance of 20 nits. Lastly, in a power off mode, the test is performed while the power of the electronic device is off.

According to each graph, the output of the solar cell is substantially higher in using the sun light than in using the halogen lamp. However, when the backlight unit generates the luminance of about 200 nits (active mode), the power consumption cannot be covered by only the solar cell, and as a result, the whole inputted output of the solar cell inputted to the device is consumed in the backlight unit.

However, in the low dimming mode, only a part of the output of the solar cell is used and the remaining output of the solar cell is charged, and in the power off mode, the whole output of the solar cell is charged in the battery.

According to FIG. 11, each solar cell has a respective characteristic. That is, since the first solar cell has an excellent current production capacity with respect to the halogen lamp, the first solar cell may be used in electronic devices mainly used indoors, and since the third solar cell has the current production capacity with respect to the sun light, the third solar cell may be used in electronic devices mainly used outdoors.

As described above, the exemplary embodiments of the disclosure provides actively controlling an output of a solar cell according to an operational state of the electronic device using the solar cell, an output of the solar cell is stored in a battery while the electronic device is not used, and the output of the solar cell is controlled to be immediately used for the electronic device while the electronic device is used. Furthermore, the electronic device is used, but remaining power may be stored in a battery when power (voltage or current) lower than the output of the solar cell is used. The invention may be formed by various exemplary embodiments, and in this application, one exemplary embodiment embodied through drawings will be primarily described. However, the general inventive concept is not limited to the exemplary embodiment shown in the drawings.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electronic device using a solar cell, comprising:
   the solar cell;
   a main body which includes a display unit, a battery, and a processing unit; and
   a power controller which connects the solar cell and the main body and controls the electronic device so that power generated from the solar cell is stored in the battery or used in the main body depending on a state of the main body.

2. The electronic device of claim 1, wherein:
   the power controller includes:
   an input terminal for the solar cell which receives an output of the solar cell;
   an output terminal for storage connected with an input terminal of the battery of the main body;

an output terminal for consumption connected with at least one of a power terminal of the display unit and a power terminal of the processing unit of the main body; and an input terminal for the battery connected with an output terminal of the battery which supplies power to at least one of the power terminal of the display unit and the processing unit of the main body.

3. The electronic device of claim 2, wherein:
the power controller transmits the output of the solar cell inputted to the input terminal for the solar cell to the battery through the output terminal for the storage, when at least one of the display unit and the processing unit of the main body does not operate.

4. The electronic device of claim 2, wherein:
the power controller transmits the output of the solar cell inputted to the input terminal for the solar cell to at least one of the display unit and the processing unit of the main body through the output terminal for consumption, when at least one of the display unit and the processing unit of the main body operates.

5. The electronic device of claim 4, wherein:
the power controller combines an output of the battery inputted from the input terminal for the battery and the output of the solar cell to output the combined output to the output terminal for consumption.

6. The electronic device of claim 4, wherein:
the power controller stores a part of the output of the solar cell inputted to the input terminal of the solar cell in the battery through the output terminal of the storage.

7. The electronic device of claim 2, wherein:
the power controller further includes:
a switching unit which is connected between the input terminal for the solar cell and the output terminal for the storage and operates depending on an input value of the input terminal for the battery; and
a power output unit which is connected with each of the input terminal for the solar cell and the input terminal for the battery to receive the output of the solar cell and the output of the battery and combines the output of the solar cell and the output of the battery to transmit the combined output to the output terminal for consumption.

8. The electronic device of claim 7, wherein:
the power output unit includes:
an input diode for the solar cell connected in a forward direction from the input terminal for the solar cell; and
an input diode for the battery connected in a forward direction from the input terminal for the battery.

9. The electronic device of claim 7, wherein:
the switching unit includes a switching unit transistor, and
an input terminal of the switching unit transistor is connected to the input terminal for the solar cell, an output terminal of the switching unit transistor is connected to the output terminal for the storage, and a control terminal is connected with the input terminal for the battery.

10. The electronic device of claim 9, wherein:
the power controller further includes:
a diode which prevents power leak of the battery connected between the output terminal of the switching unit transistor and the output terminal for the storage in a forward direction from the output terminal of the switching unit transistor.

11. The electronic device of claim 9, wherein:
the power controller further includes:
a switch controller formed between the input terminal for the battery and the control terminal of the switching unit transistor,
the switch controller includes a switch controller transistor, and
an input terminal of the switch controller transistor is connected with the control terminal of the switching unit transistor, an output terminal is connected with a ground, and a control terminal is connected with the input terminal for the battery.

12. The electronic device of claim 11, wherein:
a first resistor is formed between the output terminal of the switch controller transistor and ground,
a first node is disposed between the control terminal of the switch controller transistor and the input terminal for the battery, the first node is connected with the ground through a second resistor, and
the second resistor has a resistance higher than that of the first resistor.

13. The electronic device of claim 12, wherein:
the first node is also connected with the power output unit and
an input diode for the battery formed in a forward direction from the first node is included in the power output unit.

14. The electronic device of claim 11, wherein:
the switching unit transistor and the switch controller transistor are PNP type transistors.

15. The electronic device of claim 7, further comprising:
an input terminal capacitor connected between the input terminal for the solar cell and ground.

16. The electronic device of claim 2, wherein:
the processing unit includes an input device.

* * * * *